(12) United States Patent
Shieh et al.

(10) Patent No.: US 8,257,632 B2
(45) Date of Patent: Sep. 4, 2012

(54) HEAT-INSULATING TRANSPARENT PVC SHEET

(75) Inventors: Sung-Yueh Shieh, Taipei (TW);
Dein-Run Fung, Taipei (TW); Ying-Te Huang, Taipei (TW); Chao-Hsien Lin, Taipei (TW); Chia-Ho Cheng, Taipei (TW); Wen-Yi Wu, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 396 days.

(21) Appl. No.: 12/591,068

(22) Filed: Nov. 6, 2009

(65) Prior Publication Data

US 2010/0068494 A1    Mar. 18, 2010

Related U.S. Application Data

(63) Continuation-in-part of application No. 11/907,022, filed on Oct. 9, 2007, now abandoned.

(51) Int. Cl.

| | |
|---|---|
| *A63B 37/00* | (2006.01) |
| *B29C 45/14* | (2006.01) |
| *B29C 67/20* | (2006.01) |
| *B29C 43/00* | (2006.01) |
| *B29C 47/88* | (2006.01) |
| *B29C 47/00* | (2006.01) |
| *B29D 24/00* | (2006.01) |
| *B28B 3/20* | (2006.01) |
| *B32B 27/32* | (2006.01) |
| *B32B 5/16* | (2006.01) |

(52) U.S. Cl. ............... 264/279.1; 264/175; 264/176.1; 264/211.13; 264/275; 264/500; 428/220; 428/323

(58) Field of Classification Search .................. None
See application file for complete search history.

(56) References Cited

U.S. PATENT DOCUMENTS

| | | | | |
|---|---|---|---|---|
| 4,430,468 | A  * | 2/1984 | Schumacher | 524/109 |
| 5,908,585 | A | 6/1999 | Shibuta | |
| 6,107,360 | A | 8/2000 | Kaneko et al. | |
| 6,153,666 | A | 11/2000 | Lagace | |
| 6,221,945 | B1 | 4/2001 | Kuno et al. | |
| 6,528,156 | B1 | 3/2003 | Takizawa et al. | |
| 6,689,840 | B1 * | 2/2004 | Eustace et al. | 525/213 |
| 7,256,238 | B2 * | 8/2007 | Kubo et al. | 525/88 |
| 2002/0168503 | A1 * | 11/2002 | Dong et al. | 428/195 |
| 2004/0059049 | A1 * | 3/2004 | Barruel et al. | 524/588 |
| 2005/0004298 | A1 * | 1/2005 | Tanaka et al. | 524/493 |
| 2006/0165991 | A1 * | 7/2006 | Morii et al. | 428/403 |
| 2010/0152376 | A1 * | 6/2010 | Wermter | 524/612 |
| 2010/0292379 | A1 * | 11/2010 | Fung et al. | 524/296 |
| 2011/0223387 | A1 * | 9/2011 | Fung et al. | 428/172 |

* cited by examiner

*Primary Examiner* — Christina Johnson
*Assistant Examiner* — Benjamin Schiffman
(74) *Attorney, Agent, or Firm* — Bacon & Thomas, PLLC

(57) ABSTRACT

A heat-insulating transparent PVC sheet useful to replace the glass or affixed to the glass is made by a non-coating process for cutting-off infrared and ultra-violet, which production method is an improved traditional process for producing the PVC sheets, and in the production a specific formula of PVC blends containing PVC resin, plasticizer, inorganic heat-insulating particles and other additives is directly used to produce the PVC sheet to keep the properties of PVC and to provide transparency, low haze and an excellent effect for cutting-off infrared and ultra-violet.

1 Claim, 2 Drawing Sheets

HEAT-INSULATING TRANSPARENT PVC SHEET

CROSS REFERENCE TO RELATED APPLICATIONS

This application is a CIP of U.S. patent application Ser. No. 11/907,022 filed Oct. 9, 2007, now pending.

BACKGROUND OF THE INVENTION

1. Field of the Invention

The present invention relates to a heat-insulating transparent PVC sheet, and more particularly, to a heat-insulating transparent PVC sheet having inorganic heat-insulating particles uniformly dispersed inside and made by a non-coating process.

2. Description of the Related Art

As shown in FIG. 1, a conventional heat-insulating transparent PVC sheet 10 allows visible light to pass and cuts off infrared, and is generally pasted on the glass of buildings or cars for providing a heat-insulating effect and transparency to meet visual requirement.

However, the conventional heat-insulating transparent PVC sheet 10 does not cut off the ultra-violet well. Therefore, an UV absorbent is generally added in the PVC sheet then pasted on the glass of buildings or cars for providing an effect of cutting-off ultra-violet and thereby human bodies are protected from the damage of ultra-violet.

The processes of making conventional heat-insulating transparent PVC sheets include a dry-coating process and a wet-coating process. In both processes, a heat-insulating layer is coated on a plastic substrate and then a heat-insulating transparent sheet is produced.

As shown in FIG. 1, a heat-insulating transparent sheet 10 made by the dry-coating process has a metal, metallic oxide or inorganic material 12 uniformly attached on a plastic substrate 11 by a vacuum sputtering or evaporating process as a heat-insulating layer.

As shown in FIG. 2, in a heat-insulating transparent sheet 20 made by the wet-coating process, heat-insulating inorganic particles 22 are distributed uniformly in an appropriate resin 23 and solvent to form a coating liquid with appropriate viscosity for coating on a plastic substrate 21. After drying to remove the solvent, the inorganic particles 22 and the resin 23 become a heat-insulating layer attached on the plastic substrate 21.

However, two processes are needed in the above either the dry-coating process or the wet-coating process requires two procedures. One is making the plastic substrate and the other is coating the plastic substrate with a heat-insulating layer. Therefore, the drawbacks of the dry-coating and wet-coating processes of conventional heat-insulating sheets comprise complicated procedures, expensive equipments and slow production speed. Besides, environmental issues of waste solvents exist in the wet-coating processes.

SUMMARY OF THE INVENTION

The main purpose of the present invention is to provide a heat-insulating transparent PVC sheet having inorganic heat-insulating particles uniformly dispersed inside, which discloses a specific formula of raw materials containing PVC resin, plasticizer, inorganic heat-insulating particles and other additives, and also discloses an improved process for producing the heat-insulating transparent PVC sheet made by the specific formula of raw materials thereof capable of without a coating process, e.g., a conventional process of making PVC sheets is improved without use of coating process to produce the heat-insulating transparent PVC sheet having inorganic heat-insulating particles uniformly dispersed inside directly.

As is known to all, the transparency of a heat-insulating transparent PVC sheet may become no good if inorganic insulation particles dispersed inside, the reason is that the inorganic insulation particles inside heat-insulating transparent PVC sheet are so easily become agglomerate that causes reduction of the transparency of the PVC sheet. In addition, due to inorganic insulation particles hard to uniformly dispersed in PVC mixture or blends, resulted in that the inorganic heat-insulating particles are difficult to be processed at temperature of 150-190° C. and even easily plated out from the PVC sheet during producing process, so that this is a critical and practical reason why the above-mentioned conventional heat-insulating transparent PVC sheet has no choice but to comprise a heat-insulating layer coated on a plastic substrate by a dry-coating process and a wet-coating process.

The further purpose of the present invention is that no solvents need to be used during the whole process for producing the heat-insulating transparent PVC sheet having inorganic insulation particles uniformly dispersed inside, and no inorganic insulation particles will be plated out from the heat-insulating PVC sheet during the whole producing process. Particularly, the heat-insulating transparent PVC sheet of the present invention keeps the properties of PVC and has transparency, low haze and an excellent effect for cutting-off infrared and ultra-violet.

The process for producing a heat-insulating transparent PVC sheet of the invention is directly employed a known conventional process generally applied for making general PVC sheets but no coating process needed to produce the heat-insulating transparent PVC sheet, and then a specific formula of PVC mixture or blends containing PVC resin, plasticizer, inorganic heat-insulating particles or other additive undergoes a calendering process by a Calender, or undergoes a T-Die process by a T-Die machine, or undergoes a blow-molding process by a blow-molding machine, to obtain a product of heat-insulating transparent PVC sheet having good transparency, low haze and an excellent effect for cutting-off infrared and ultra-violet.

The heat-insulating transparent PVC sheet of the present invention may only depend on the demand for different properties such as excellent in light transmittance rate or/and the infrared cutting-off rate to select a small amount of either $LaB_6$ or $CeB_6$ alone as inorganic heat-insulting particles or further in combination of small amount of ATO as inorganic heat-insulting particles and uniformly dispersed in a PVC mixture prepared for producing the heat-insulating transparent PVC sheet of the present invention through a conventional process for making PVC sheets but improved without a coating process.

Therefore, the process for producing a heat-insulating transparent PVC sheet according to the present invention has advantages of simple procedures, low production costs, fast production speed and environmental friendliness.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
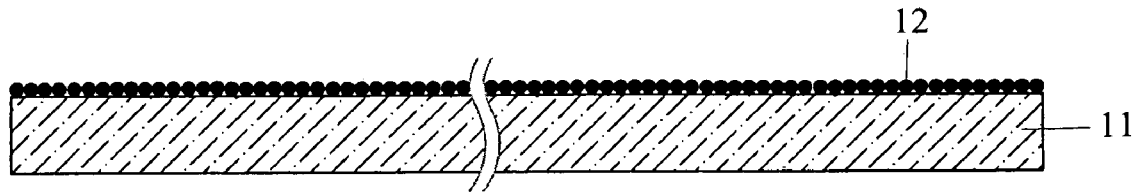
FIG. 1 is a cross-sectional enlarged view of a heat-insulating transparent sheet produced by a conventional dry-coating process.
Figure 2:
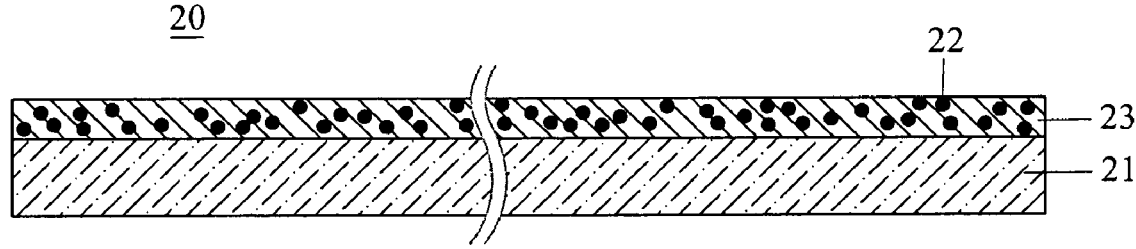
FIG. 2 is a cross-sectional enlarged view of a heat-insulating transparent sheet produced by a conventional wet-coating process.
Figure 3:
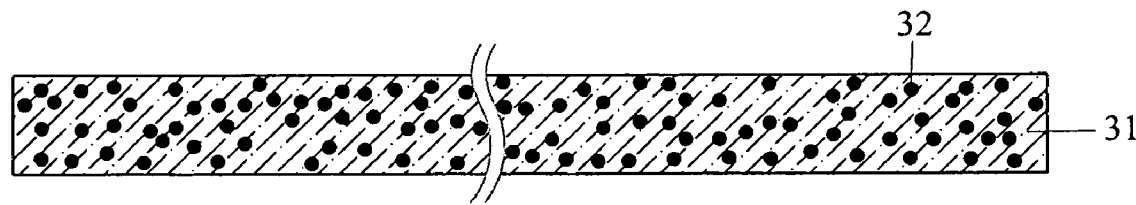
FIG. 3 is a cross-sectional enlarged view of a heat-insulating transparent PVC sheet made by a non-coating process for cutting-off infrared and ultra-violet according to one preferred embodiment of the present invention.

As shown in FIG. 3, a heat-insulating transparent PVC sheet 30 according to one preferred embodiment of the present invention is a soft, semi-hard or hard sheet of thickness of 0.02-1.0 mm and has transparency as well as a characteristic of cutting-off infrared and ultra-violet. The disclosed heat-insulating transparent PVC sheet 30 is characterized by: a PVC sheet 31 of thickness of 0.02-1.0 mm as a substrate and inorganic heat-insulating particles 32 uniformly dispersed in the PVC sheet 31.

The process for producing the heat-insulating transparent PVC sheet 30 according to one preferred embodiment of the present invention uses a specific formula as a raw material, and a conventional process for making PVC sheets is used directly without a coating process to produce the heat-insulating transparent PVC sheet 30 for cutting-off infrared and ultra-violet, and has advantages of simple procedures, low equipment costs and fast production speed.

The production method of the heat-insulating transparent PVC sheet 30 includes the following steps:

(1) Introducing raw materials including coupling agent of 0.01-15.0 PHR, ultraviolet absorber of 0.01-5.0 PHR, dispersant of 0.01-10.0 PHR, inorganic heat-insulating particles of 0.01-15.0 PHR and plasticizers of 1-45 PHR into a dispersing device, and having those added raw materials uniformly dispersed and finally formed as a paste through high-speed shear force exerted from the dispersing device under temperature of 25-70° C., (2) Sequentially introducing the paste made of step (1), PVC resin of 100 PHR, plasticizer of 1-85 PHR, stabilizer of 0.1-15.0 PHR, lubricant of 0.1-15.0 PHR and colorant of 0-12.0 PHR into a mixer device for uniformly mixing as a PVC mixture. After completion of mixing, draw the PVC mixture into a Banbury mixer for refinement;

(3) Controlling the PVC mixture at temperature of 150-190° C., heating and shearing the PVC mixture in a roller machine for well-gelation, and proceeding one of the following processes:
  (i) calendering the PVC mixture by a Calender to form a heat-melting sheet of thickness of 0.05-1.0 mm, and then entering step (4) after forming;
  (ii) processing the PVC mixture by a T-Die machine to form a heat-melting sheet of thickness of 0.05-1.0 mm, and then entering step (4) after forming; or
  (iii) processing the PVC mixture by a blow-molding machine to form a heat-melting sheet of thickness of 0.02-0.08 mm, and then entering step (4) after forming;

(4) Drawing the formed heat-melting sheet into water at temperature of 10-50° C. for cooling, and then entering step (5) after dehydration; and (5) Drawing the sheet into a cooling wheel for cooling and shaping, and then rolling up the sheet to realize the heat-insulating transparent PVC sheet 30.

In the step (1), the PVC resin is selected from a PVC polymer or a PVC copolymer made by bulk polymerization, solution polymerization, suspension polymerization or emulsion polymerization, either used solely or in combination. Preferably, the PVC resin is made by suspension polymerization and has DP (Degree of polymerization) in the range of 700-2000.

In the step (1), the plasticizer is selected from the group consisting of a phosphate, a phthalic acid group e.g. dioctyl phthalate (DOP) or di(isononyl) phthalate (DINP), a trimellitate, an epoxy, a polyester, a chlorinated hydrocarbon and an aliphatic acid ester, either used solely or in combination.

In the step (1), the inorganic heat-insulating particles 32 with particle diameter of 0.005-2 μm, depending on the demand for different properties such as transparency and haze, may be selected from hexaborides or metal oxide.

Therein, the hexaborides include lanthanum hexaboride ($LaB_6$), cerium hexaboride ($CeB_6$), praseodymium hexaboride ($PrB_6$), neodymium hexaboride ($NdB_6$), samarium hexaboride ($SmB_6$), europium hexaboride ($EuB_6$), gadolinium hexaboride ($GdB_6$), terbium hexaboride ($TbB_6$), dysprosium hexaboride ($DyB_6$), holmium hexaboride ($HoB_6$), erbium hexaboride ($ErB_6$), thulium hexaboride ($TmB_6$), ytterbium hexaboride ($YbB_6$), lutetium hexaboride ($LuB_6$), strontium hexaboride ($SrB_6$), calcium hexaboride ($CaB_6$) or yttrium hexaboride ($YB_6$) or the mixture thereof.

And, the metal oxides may be selected from the group consisting of $ZnO$, $V_2O_5$, $In_2O_3$, $CeO_2$, $SnO_2$, $Sb_2O_3$, $ZnS$, ATO (tin oxide antimony doped) and ITO (tin oxide indium doped).

The inorganic heat-insulting particles are chosen from the above-mentioned metal oxide or hexaborides alone or the mixture of more than one of them.

In the step (1), the stabilizer may be one or more than one selected from the group consisting of a Ba—Zn group, Ca—Zn group and organic Sn.

In the step (1), the lubricant may be one, more than one or all selected from the group consisting of a stearic acid, fatty acid, fatty acid amide, ester group, metallic crystal carbonate and organic silicon group.

In the step (1), the purpose of adding dispersant and coupling agent into the mixer device is to make the inorganic heat-insulating particles 32 uniformly dispersed in the PVC sheet 31, for achievement of this purpose there is a critical requirement should be executed in which the dispersant and coupling agent should be uniformly dispersed in a paste through high-speed shear force exerted from the dispersing device under temperature of 25-70° C. Resulted in that the inorganic heat-insulating particles 32 shall be no plate out from the PVC mixture during Calendering process and the PVC sheet 31 due to having inorganic heat-insulating particles 32 uniformly dispersed inside possesses some superior properties including high transparency and good heat-insulating effect of cutting-off infrared.

The coupling agent is selected from the group consisting of an organosilane compound, an organic Zr—Al compound and an organic Ti—Al compound.

The dispersant is selected from the group consisting of a copolymer dispersant, dispersant containing silicon and dispersant containing fluorine, either used solely or in combination.

The UV absorbent can be one or more than one selected from the group consisting of a 1-hydroxybenzotriazole and a hydroxy benzophenone.

In the step (1), the colorant can be added more or less according to the desired hue of the product, and can be an organic colorant, an inorganic colorant or a mixture of both.

Figure 4:
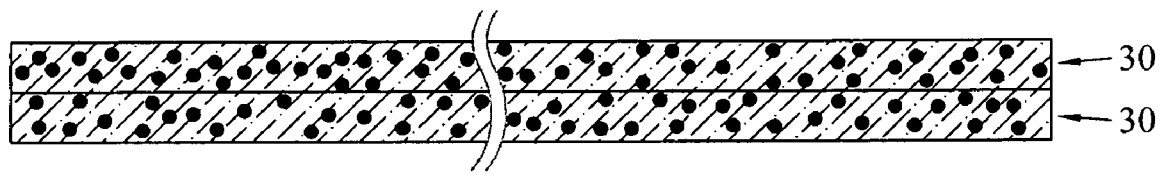
FIG. 4 is a schematic view showing that the heat-insulating transparent PVC sheets are stacked for use.
Figure 5:
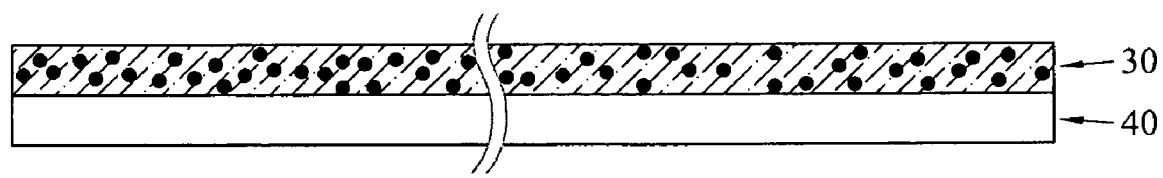
FIG. 5 is a schematic view showing that the heat-insulating transparent PVC sheet is stacked with another plastic substrate for use.

While in use, the heat-insulating transparent PVC sheet 30 can not only be a single layer but also be stacked as shown in FIG. 4, or be stacked with another plastic substrate 40 as shown in FIG. 5.

Example of Embodiment

Preferred embodiments are shown below to describe the properties of the heat-insulating transparent PVC sheet 30 produced according to the production method of the present invention. In addition, the determination of each property of the heat-insulating transparent PVC sheet 30 is following the test methods as described below.

(1) Test of Visible Light Transmittance and Haze:

A light transmittance and haze meter of model number TC-H☐ produced by Tokyo Denshoku Co., Ltd is used according to the JIS K7705 test standard to test the light transmittance and haze of the PVC sheet. When the test result shows high visible light transmittance and low haze, the PVC sheet has a good transparency.

(2) Test of Cutting-Off Rate of Infrared and Ultra-Violet:

An infrared cutting-off rate tester of model number LT-3000 produced by HOYA is used according to the JIS R3106 test standard to test the cutting-off rate of infrared of the PVC sheet. When the test result shows high infrared cutting-off rate, the PVC sheet has a good heat-insulating effect; and when the test result shows low UV transmittance, the PVC sheet has a good UV cutting-off effect.

Example 1

The process for producing a heat-insulating transparent PVC sheet having thickness of 0.2 mm and containing contains plasticizer of 40 PHR is as follows:

(1) introduce coupling agent of 3.2 PHR, ultraviolet absorber of 0.8 PHR, dispersant of 1.57 PHR, ATO of 2.2 PHR and DINP of 15 PHR into a dispersing device for uniformly dispersion as a paste through high-speed shear force exerted from the dispersing device under temperature of 25-70° C.;

(2) sequentially introducing the paste made of step (1), PVC resin of 100 PHR, DINP of 25 PHR (plus the advanced introduction of 15 PHR, total of 40 PHR), stabilizer of Ba—Zn group of 3 PHR, Stearic acid of 0.4 PHR and colorant 0-12.0 PHR into a mixer device for uniform mixing as a PVC mixture, and then drawing the PVC mixture into a Banbury mixer for refinement;

(3) Controlling the PVC mixture at temperature of 150-190° C., heating and shearing the PVC mixture in a roller machine, and then calendering the PVC mixture by a Calender to form a heat-melting sheet of thickness of 0.2 mm;

(4) drawing the heat-melting sheet of thickness of 0.2 mm into water at temperature of 10-50° C. to cool and harden the sheet; and (5) after dehydration, drawing the sheet into a cooling wheel for cooling and shaping, and then rolling up the heat-insulating transparent PVC sheet.

The test result is shown in Table 1. The heat-insulating transparent PVC sheet has thickness of 0.2 mm and contains plasticizer of 40 PHR. And, the heat-insulating transparent PVC sheet has a good transparency and well infrared and UV cutting-off rate. In particular, no inorganic heat-insulating particles will be plated out from the PVC sheet during the whole producing process.

Example 2

Except that the thickness is made as 0.3 mm, the formula of raw materials and the process for producing the heat-insulating transparent PVC sheet is the same as that in the example 1.

The test result is shown in Table 1. The heat-insulating transparent PVC sheet of thickness of 0.3 mm has a good transparency and well infrared and UV cutting-off rate. In particular, no inorganic heat-insulating particles will be plated out from the PVC sheet during the whole producing process.

Example 3

Except adoption of blow-molding process for producing the heat-insulating transparent PVC sheet of thickness of 0.02 mm and softness of 40 PHR, and the specific formula of raw materials as in Table 1, the other producing process is the same as that in the example 1.

The test result is shown in Table 1. The heat-insulating transparent PVC sheet has a good transparency and well infrared and UV cutting-off rate. In particular, no inorganic heat-insulating particles will be plated out from the PVC sheet during the whole producing process.

Example 4

Except that the thickness is made as 1.0 mm, the formula of raw materials and the process for producing the heat-insulating transparent PVC sheet is the same as that in the example 1.

The test result is shown in Table 1. The heat-insulating transparent PVC sheet of thickness of 1.0 mm has a good transparency and well infrared and UV cutting-off rate. In particular, no inorganic heat-insulating particles will be plated out from the PVC sheet during the whole producing process.

Example 5

Except adoption of T-Die process for producing the heat-insulating transparent PVC sheet having thickness of 0.2 mm and containing plasticizer of 40 PHR, and the specific formula of raw materials as in Table 1, the other producing process is the same as that in the example 1.

The test result is shown in Table 1. The heat-insulating transparent PVC sheet has a good transparency and well infrared and UV cutting-off rate. In particular, no inorganic heat-insulating particles will be plated out from the PVC sheet during the whole producing process.

Example 6

Except that the thickness is made as 0.3 mm, the formula of raw materials and the process for producing the heat-insulating transparent PVC sheet is the same as that in the example 5.

The test result is shown in Table 1. The heat-insulating transparent PVC sheet of thickness of 0.3 mm has a good transparency and well infrared and UV cutting-off rate. In particular, no inorganic heat-insulating particles will be plated out from the PVC sheet during the whole producing process.

Example 7

According to the specific formula as in Table 1, a heat-insulating transparent PVC sheet having thickness of 0.2 mm and containing plasticizer of 40 PHR is produced according to the production method in the example 1.

The test result is shown in Table 1. The heat-insulating transparent PVC sheet has a good transparency and well infrared and UV cutting-off rate. In particular, no inorganic heat-insulating particles will be plated out from the PVC sheet during the whole producing process.

Example 8

Except that the thickness is made as 0.3 mm, the formula of raw materials and the process for producing the heat-insulating transparent PVC sheet is the same as that in the example 7.

The test result is shown in Table 1. The heat-insulating transparent PVC sheet of thickness of 0.3 mm has a good transparency and well infrared and UV cutting-off rate. In particular, no inorganic heat-insulating particles will be plated out from the PVC sheet during the whole producing process.

Example 9

Except the formula of raw material contains coupling agent of 0.81 PHR and dispersant of 0.17 PHR and takes $LaB_6$ of 0.25 PHR as inorganic heat-insulating particles to replace ATO used in Example 1, and the specific formula of raw materials as in Table 1, the other producing process is the same as that in the example 1.

The test result is shown in Table 1. The heat-insulating transparent PVC sheet of this exemplary embodiment has the light transmittance rate up to 72% better than that of the same thickness of 0.2 mm of heat-insulating transparent PVC sheet shown in Examples 1, 5 and 7 which formula of raw material takes ATO as inorganic heat-insulating particles, and also has the haze rate lowered to 1.7% which shows the heat-insulating transparent PVC sheet of this exemplary embodiment has high visible light transmittance and low haze and has a good transparency.

Further, the heat-insulating transparent PVC sheet of this exemplary embodiment has the infrared cutting-off rate of 67% and the UV cutting-off rate of 99%, wherein the infrared cutting-off rate is close to that of the same thickness of 0.2 mm of heat-insulating transparent PVC sheet containing ATO of 6 PHR shown in Examples 5.

The test result shows no inorganic heat-insulating particles will be plated out from the heat-insulating transparent PVC sheet of this exemplary embodiment during the whole producing process.

In comparison with Example 5, the results also showed that the heat-insulating transparent PVC sheet of this exemplary embodiment only containing a small amount of $LaB_6$ still has good light transmittance and even possesses the infrared cutting-off rate of 67% close to that of the same thickness of heat-insulating transparent PVC sheet containing high volume of ATO shown in Examples 5.

Example 10

Except the formula of raw material contains coupling agent of 0.81 PHR and dispersant of 0.17 PHR and takes $CeB_6$ of 0.25 PHR as inorganic heat-insulating particles to replace ATO used in Example 1, and the specific formula of raw materials as in Table 1, the other producing process is the same as that in the example 1.

The test result is shown in Table 1. The heat-insulating transparent PVC sheet of this exemplary embodiment has the light transmittance rate up to 70% and the haze rate lowered to 2.0% which shows the heat-insulating transparent PVC sheet of this exemplary embodiment has high visible light transmittance and low haze and has a good transparency.

In comparison with Example 3, the results also showed that the heat-insulating transparent PVC sheet of this exemplary embodiment has the light transmittance rate of 70% inferior to that of the heat-insulating transparent PVC sheet shown in Example 3, but the thickness of the heat-insulating transparent PVC sheet of this exemplary embodiment is 0.2 mm which thickness is ten times to only 0.02 mm thickness of the heat-insulating transparent PVC sheet shown in Example 3.

The heat-insulating transparent PVC sheet of this exemplary embodiment has the infrared cutting-off rate of 64% and the UV cutting-off rate of 99%, wherein the infrared cutting-off rate is close to that of the same thickness of 0.2 mm of heat-insulating transparent PVC sheet containing $LaB_6$ of 0.25 PHR shown in Examples 9, but inferior to that of the heat-insulating transparent PVC sheet containing ATO shown in Examples 5 and 7.

The test result shows no inorganic heat-insulating particles will be plated out from the heat-insulating transparent PVC sheet of this exemplary embodiment during the whole producing process.

The results also showed that the heat-insulating transparent PVC sheet of this exemplary embodiment only containing a small amount of $CeB_6$ still has good light transmittance and even possesses the infrared cutting-off rate of 64%.

Example 11

Except the formula of raw material contains coupling agent of 6.97 PHR and dispersant of 0.95 PHR and takes in combination of ATO of 1.8 PHR and $LaB_6$ of 0.25 PHR as inorganic heat-insulating particles to replace ATO only used in Example 1, and the specific formula of raw materials as in Table 1, the other producing process is the same as that in the example 1.

The test result is shown in Table 1. The heat-insulating transparent PVC sheet of this exemplary embodiment has the light transmittance rate up to 69% same as that of the same thickness of 0.2 mm of heat-insulating transparent PVC sheet shown in Examples 1, better than that of the same thickness of 0.2 mm of heat-insulating transparent PVC sheet shown in Examples 5 and 7 which formula of raw material takes ATO as inorganic heat-insulating particles, and close to that of the same thickness of 0.2 mm of heat-insulating transparent PVC sheet shown in Examples 9 and 10 which formula of raw material takes a small amount of $LaB_6$ and $CeB_6$ as inorganic heat-insulating particles.

The heat-insulating transparent PVC sheet of this exemplary embodiment also has the haze rate lowered to 2.6% which shows the heat-insulating transparent PVC sheet of this exemplary embodiment has high visible light transmittance and low haze and has a good transparency.

Further, the heat-insulating transparent PVC sheet of this exemplary embodiment has the infrared cutting-off rate of 91% and the UV cutting-off rate of 99%, wherein the infrared cutting-off rate is better than that of the same thickness of 0.2 mm of heat-insulating transparent PVC sheet containing ATO shown in Examples 1 and 5, close to that of the same thickness of 0.2 mm of heat-insulating transparent PVC sheet shown in Example 7, and superior to that of the same thickness of 0.2 mm of heat-insulating transparent PVC sheet shown in Examples 9 and 10 which formula of raw material takes a small amount of $LaB_6$ and $CeB_6$ as inorganic heat-insulating particles.

The test result shows no inorganic heat-insulating particles will be plated out from the heat-insulating transparent PVC sheet of this exemplary embodiment during the whole producing process.

The results also showed that the heat-insulating transparent PVC sheet of this exemplary embodiment, if contains a small amount of ATO and $CeB_6$ as inorganic heat-insulating particles, shall effectively improve the properties of the light transmittance rate and the infrared cutting-off rate more excellently.

Comparative Example 1

Except that the raw materials of the heat-insulating transparent PVC sheet do not include the inorganic heat-insulating particles, the coupling agent and the dispersant, the production method is the same as that in the example 1.

The test result is shown in Table 1. The raw materials of the heat-insulating transparent PVC sheet of thickness of 0.2 mm do not contain the inorganic heat-insulating particles and thus the infrared cutting-off rate is worse than those in the examples 1, 5, 7, 9, 10 and 11.

Comparative Example 2

Except that the raw materials of the heat-insulating transparent PVC sheet do not include the coupling agent and the dispersant, the production method is the same as that in the example 1.

The test result is shown in Table 1. The raw materials of the heat-insulating transparent PVC sheet of thickness of 0.2 mm do not contain the coupling agent and the dispersant and thus the infrared and UV cutting-off rates are worse than those in the examples 11, 5, 7, 9, 10 and 11.

In addition, the inorganic heat-insulating particle of ATO is plated out during the process and affects the production process and quality of the transparent PVC sheet.

Comparative Example 3

A colorless transparent glass of size of 100 mm*100 mm*0.3 mm is used as comparison to measure the light transmittance, haze, infrared and UV cutting-off rates.

The test result is shown in Table 1. The infrared and UV cutting-off rates of the colorless transparent glass is worse than those in the examples 2, 4, 6 and 8.

Result

1. From Examples 1 to 11 mentioned above, no inorganic heat-insulating particles will be plated out from the PVC sheet during the whole producing process, so that the heat-insulating transparent PVC sheet of thickness of 0.02 mm-0.3 mm has a good transparency and well infrared and UV cutting-off rate.

2. From Examples 9, 10 and 11 mentioned above, the heat-insulating transparent PVC sheet of the present invention may only depend on the demand for different properties such as excellent in light transmittance rate or/and the infrared cutting-off rate to select a small amount of either $LaB_6$ or $CeB_6$ alone as inorganic heat-insulting particles or further in combination of small amount of ATO as inorganic heat-insulting particles and uniformly dispersed in a paste prepared for producing the heat-insulating transparent PVC sheet of the present invention through a conventional process for making PVC sheets but improved without a coating process.

TABLE 1

| | | | Example | | | | | | | |
|---|---|---|---|---|---|---|---|---|---|---|
| | | NAME | 1 | 2 | 3 | 4 | 5 | 6 | 7 | 8 |
| Formula | Substrate | PVC | 100 | 100 | 100 | 100 | 100 | 100 | 100 | 100 |
| | | glass | — | — | — | — | — | — | — | — |
| | Plasticizer | DINP | 40 | 40 | 40 | 40 | 40 | 40 | 40 | 40 |
| | Inorganic | ATO | 2.2 | 2.2 | 0.3 | 2.2 | 6.0 | 6.0 | 15 | 15 |
| | Heat-insulating | $LaB_6$ | — | — | — | — | — | — | — | — |
| | particles | $CeB_6$ | — | — | — | — | — | — | — | — |
| | Stabilizer | Ba—Zn group | 3 | 3 | 3 | 3 | 3 | 3 | 3 | 3 |
| | Lubricant | Stearic acid | 0.4 | 0.4 | 0.4 | 0.4 | 0.4 | 0.4 | 0.4 | 0.4 |
| | Additive | Coupling agent | 3.2 | 3.2 | 0.44 | 3.2 | 5.73 | 5.73 | 7.18 | 7.18 |
| | | Dispersant | 1.57 | 1.57 | 0.21 | 1.57 | 2.19 | 2.19 | 6.2 | 6.2 |
| | | UV absorbent | 0.8 | 0.8 | 0.8 | 0.8 | 0.8 | 0.8 | 0.8 | 0.8 |
| Properties | Substrate thickness (mm) | | 0.2 | 0.3 | 0.02 | 1.0 | 0.2 | 0.3 | 0.2 | 0.3 |
| | Light transmittance (%) | | 69 | 58 | 85 | 49 | 40 | 26 | 19 | 17 |
| | Haze (%) | | 2.2 | 2.5 | 1.2 | 3.1 | 8.7 | 10.3 | 10.4 | 12.7 |
| | Infrared cutting-off rate (%) | | 43 | 61 | 14 | 70 | 73 | 87 | 92 | 95 |
| | UV cutting-off rate (%) | | 99 | 99 | 98 | 99 | 99 | 99 | 99 | 99 |
| Inorganic heat-insulating particles is plated out or not | | | no | no | no | no | no | no | no | no |

TABLE 1-continued

| | | | Example | | | Comparative Example | | |
|---|---|---|---|---|---|---|---|---|
| | | NAME | 9 | 10 | 11 | 1 | 2 | 3 |
| Formula | Substrate | PVC | 100 | 100 | 100 | 100 | 100 | — |
| | | glass | — | — | — | — | — | Colorless transparent glass |
| | Plasticizer | DINP | 40 | 40 | 40 | 40 | 40 | — |
| | Inorganic Heat-insulating particles | ATO | — | — | 1.8 | — | 2.2 | — |
| | | $LaB_6$ | 0.25 | — | 0.25 | — | — | — |
| | | $CeB_6$ | — | 0.25 | — | — | — | — |
| | Stabilizer | Ba—Zn group | 3 | 3 | 3 | 3 | 3 | — |
| | Lubricant | Stearic acid | 0.4 | 0.4 | 0.4 | 0.4 | 0.4 | — |
| | Additive | Coupling agent | 0.81 | 0.81 | 6.97 | — | — | — |
| | | Dispersant | 0.17 | 0.17 | 0.95 | — | — | — |
| | | UV absorbent | 0.8 | 0.8 | 0.8 | 0.8 | 0.8 | — |
| Properties | Substrate thickness (mm) | | 0.2 | 0.2 | 0.2 | 0.2 | 0.2 | 0.3 |
| | Light transmittance (%) | | 72 | 70 | 69 | 86 | 50 | 93 |
| | Haze (%) | | 1.7 | 2.0 | 2.6 | 1.4 | 12.0 | 0.6 |
| | Infrared cutting-off rate (%) | | 67 | 64 | 91 | 8 | 29 | 22 |
| | UV cutting-off rate (%) | | 99 | 99 | 99 | 98 | 98 | 27 |
| Inorganic heat-insulating particles is plated out or not | | | no | no | no | no | yes | — |

Ingredient unit: PHR (per hundred unit weight of resin)

What is claimed is:

1. A process for producing heat-insulating transparent PVC sheet having inorganic heat-insulating particles uniformly dispersed inside, comprising the following steps:
   (1) introducing raw materials including coupling agent of 0.01-15.0 PHR, ultraviolet absorber of 0.01-5.0 PHR, dispersant of 0.01-10.0 PHR, inorganic heat-insulating particles of 0.01-15.0 PHR and plasticizers of 1-45 PHR in a dispersing device and finally formed as a paste through high-speed shear force exerted from the dispersing device under temperature of 25-70° C.;
   (2) sequentially introducing the paste made of step (1), PVC resin of 100 PHR, plasticizer of 1-85 PHR, stabilizer of 0.1-15.0 PHR, lubricant of 0.1-15.0 PHR and colorant of 0-12.0 PHR into a mixer device for uniform mixing as a PVC mixture; and further drawing the PVC mixture into a Banbury mixer for refinement;
   (3) controlling the PVC mixture at temperature of 150-190° C., heating and shearing the PVC mixture in a roller machine for well-gelation, and proceeding one of the following processes:
      (i) calendering the PVC mixture by a Calender to form a heat-melting sheet of thickness of 0.05-1.0 mm, and then entering step (4) after forming;
      (ii) processing the PVC mixture by a T-Die machine to form a heat-melting sheet of thickness of 0.05-1.0 mm, and then entering step (4) after forming; or
      (iii) processing the PVC mixture by a blow-molding machine to form a heat-melting sheet of thickness of 0.02-0.08 mm, and then entering step (4) after forming;
   (4) drawing the formed heat-melting sheet into water at temperature of 10-50° C. for cooling, and then entering step (5) after dehydration; and
   (5) drawing the sheet into a cooling wheel for cooling and shaping, and then rolling up to obtain the heat-insulating transparent PVC sheet.

* * * * *